United States Patent [19]

Key

[11] Patent Number: 4,874,192

[45] Date of Patent: Oct. 17, 1989

[54] PIPE JOINT GLAND REINFORCING STRUCTURE

[76] Inventor: Kenneth W. Key, 2609 Old Gadsden Hwy., Anniston, Ala. 36206

[21] Appl. No.: 207,171

[22] Filed: Jun. 15, 1988

[51] Int. Cl.⁴ .............................................. F16L 19/03
[52] U.S. Cl. ..................................... 285/337; 285/413
[58] Field of Search ............... 285/337, 368, 374, 399, 285/404, 412, 413, 422

[56] References Cited

U.S. PATENT DOCUMENTS 2,984,504  5/1961  Boughton ..................... 285/413 X
4,544,188  10/1985  Dugger ............................ 285/337

FOREIGN PATENT DOCUMENTS 0446274  1/1948  Canada ............................ 285/337
1580069  8/1969  France ............................ 285/337

OTHER PUBLICATIONS

Catalog, M. B. Skinner Co., South Bend, Ind. Rec. 1/15/37 copy in Library TJ4185628 pp. 11-13 "BellJoint".
Charles D. Bruch, P.E., *Mechanics for Technology.* (New York, John Wiley & Sons Inc., 1976) pp. 151-168.

*Primary Examiner*—Randolph A. Reese
*Assistant Examiner*—P. Frechette
*Attorney, Agent, or Firm*—Jennings, Carter, Thompson & Veal

[57] ABSTRACT

An improvement to a pipe joint gland utilizes a pair of radially extending ribs formed at each boss separated at about 90° from each other and a second pair of ribs extending from the bosses along the circumference of the pipe joint gland. Each rib slopes downwardly from the top of the boss to the surface of the gland. The ribs are arranged in a non-parallel, non-intersecting fashion which provides improved radial and annular rigidity to the gland.

8 Claims, 2 Drawing Sheets

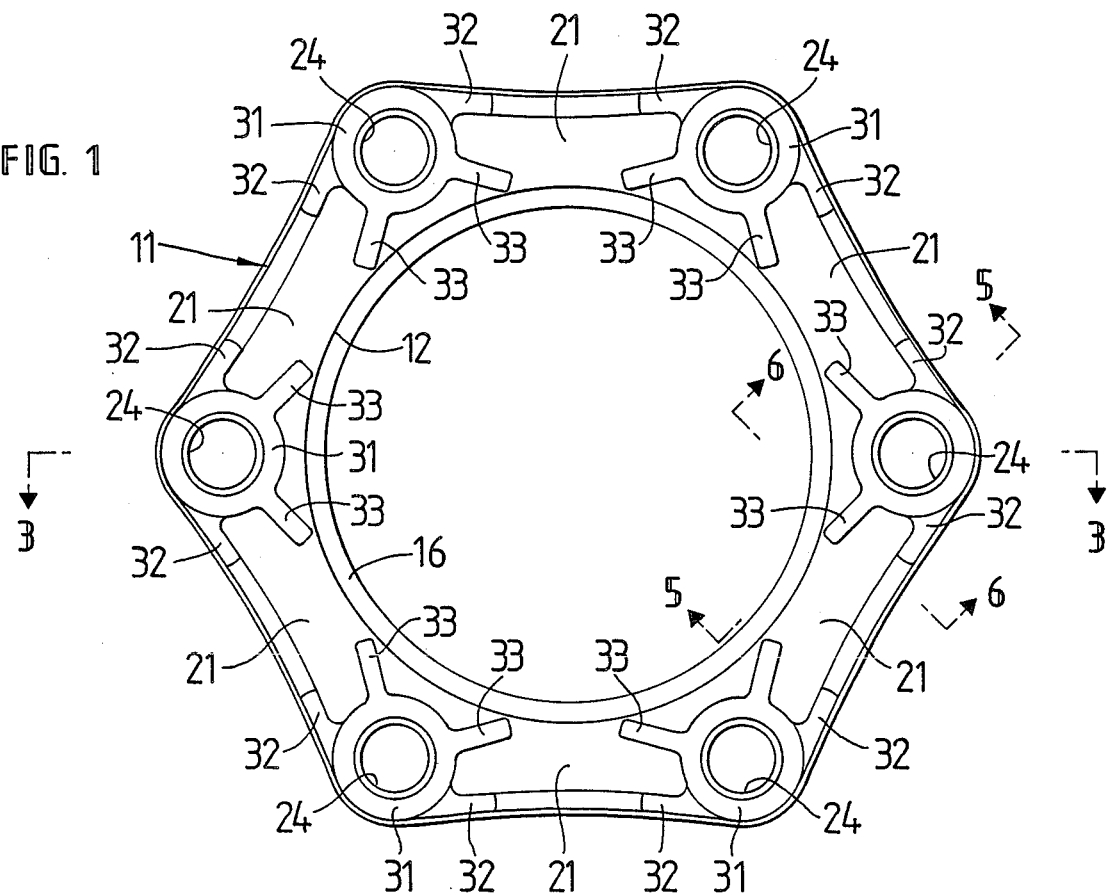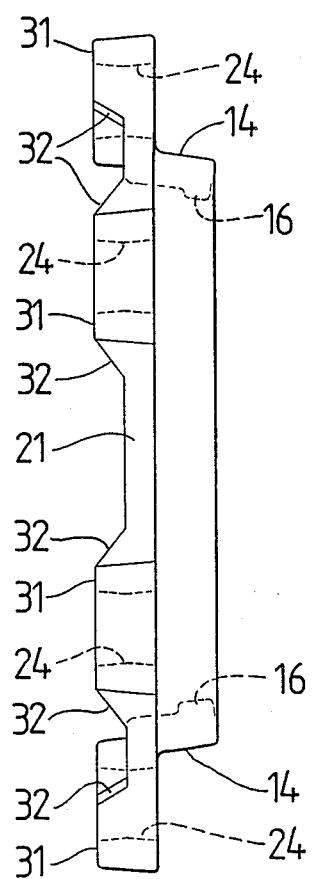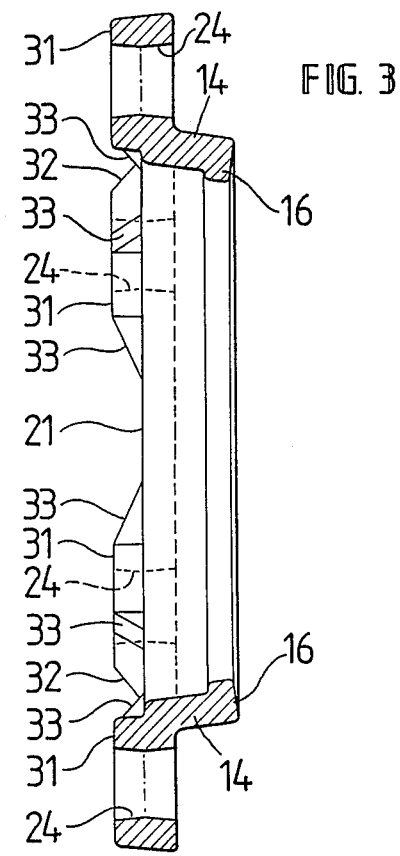

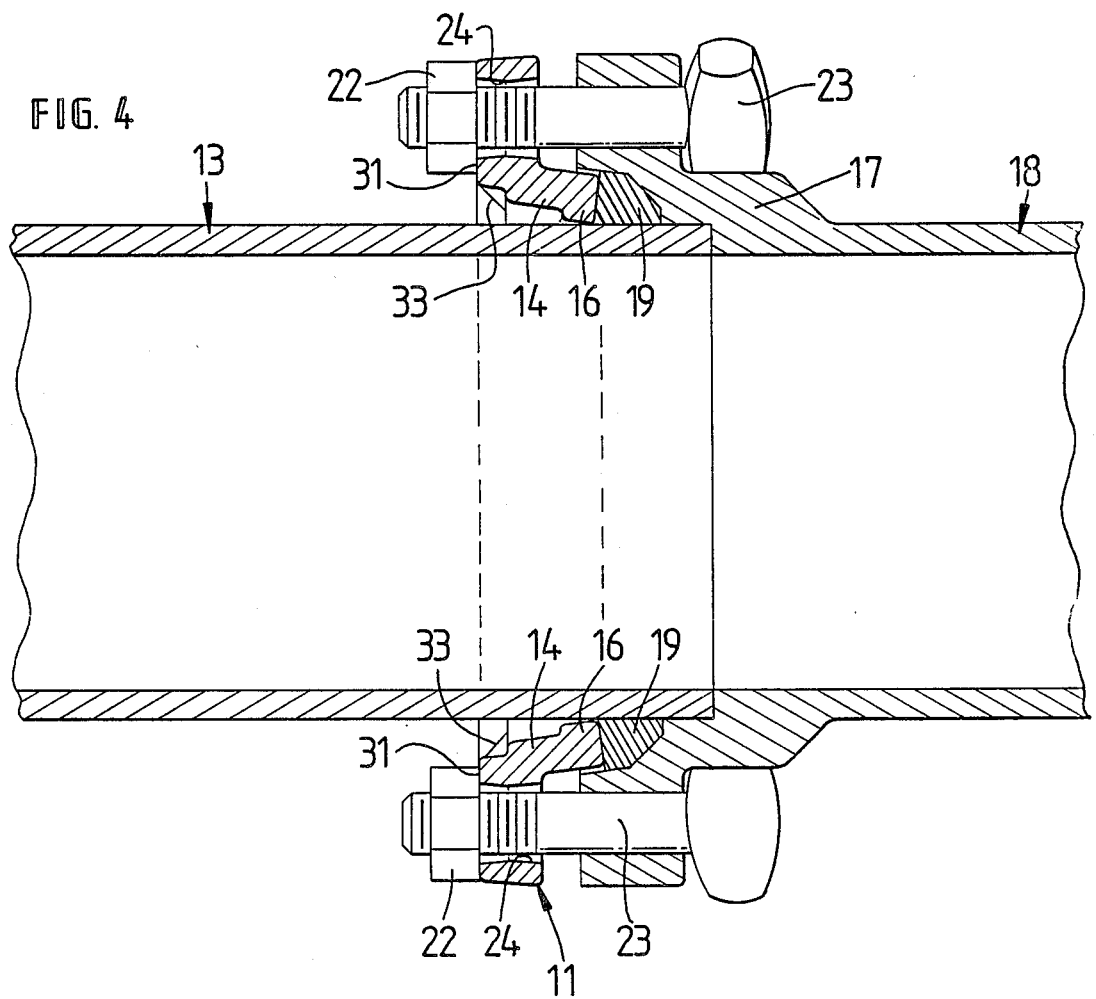
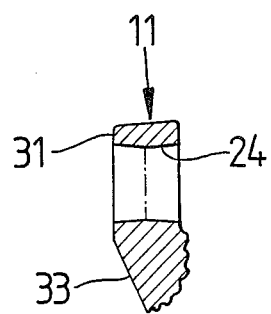
FIG. 5
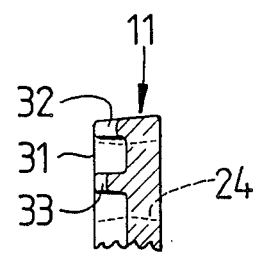
FIG. 6

4,874,192

PIPE JOINT GLAND REINFORCING STRUCTURE

FIELD OF THE INVENTION

The present invention relates to devices utilized to join pipe sections such as at joints where a bell pipe end and spigot pipe end are connected. More particularly the present invention relates to the pipe joint glands used at such joints and specifically to an improvement in the reinforcing of such glands.

BACKGROUND OF THE INVENTION

The use of pipe joint glands in the connection of pipe sections is well known in the art and there are probably dozens of variations of such glands. Generally such glands fit about the spigot end of a pipe section and receive a plurality of bolts therethrough which connect the gland to a bell end of a pipe section. A sealing gasket may be compressed between the gland and the bell end about the spigot end. Oftentimes such glands have been made from cast ductile iron and such material has proven to be satisfactory. Nonetheless, certain problems do exist. Particularly, the bolt in the glands are spaced outwardly from the pipe wall, thus as the bolts are tightened to compress the gasket and seal the gland, the periphery of the gland tends to deform. Premature deformation of the gland can occur such that the gasket is not adequately compressed and the seal is not adequately formed. Some prior art devices, such as that disclosed in U.S. Pat. No. 4,544,188, have used ribbing on the surface of the gland to strengthen the gland and impart a degree of rigidity thereto. However, no satisfactory design of the reinforcing members has heretofore been known to me that would resist the bending stresses about the bolt holes both radially within the gland and intermediate the bolt holes.

SUMMARY OF THE INVENTION

It is the object of the present invention to provide a gland reinforcing structure which improves the rigidity of the gland and its ability to resist premature bending of the gland at a pipe joint seal.

Another object of the invention is to provide a gland reinforcing structure which achieves the foregoing object without adding excessive weight to the gland.

Yet another object of my invention is to provide a gland reinforcing structure which also provides an additional seating area for the heads of connecting bolts used therewith.

These and other objects of my invention are accomplished using a novel arrangement of reinforcing ribs which extend to the tops of the bosses surrounding each bolt hole and taper to the surface of the gland. The ribs are arranged in pairs oriented along selected lines to improve the rigidity of the gland. Specifically one pair of ribs extend radially from each boss at about 90° separation and are bisected by a radial line through the associated boss and the gland, while another pair of ribs extend from the boss circumferentially along the gland.

BRIEF DESCRIPTION OF THE DRAWINGS

A gland embodying features of my invention is depicted in the accompanying drawings which form a portion of this disclosure and wherein:

FIG. 1 is a plan view of my gland showing the arrangement of the reinforcing ribs;

FIG. 2 is a side view of my gland looking from any direction perpendicular to the plan view;

FIG. 3 is a sectional view taken along line 3—3 of FIG. 1;

FIG. 4 is a sectional view of a pipe joint utilizing my gland;

FIG. 5 is a partial sectional view taken along line 5—5 of FIG. 1; and

FIG. 6 is a partial sectional view taken along line 6—6 of FIG. 1.

DESCRIPTION OF A PREFERRED EMBODIMENT

Referring to the figures for a clearer understanding of the invention, it may be seen in FIG. 1 that the gland 11 is an annular member cast in one piece from a material such as ductile iron which provides an advantageous strength and weight combination. The gland 11 has a circular central orifice 12 which fits around the spigot end of a pipe section 13 as seen in FIG. 4. The orifice 12 is defined by an axially extending wall 14 as is conventional in glands of this type which terminates in a seal engaging portion 16 which fits cooperatively within a bell end 17 of a second pipe section 18 to compress a sealing gasket 19 in a manner well understood in the art. The gland 11 also has a radially extending polygonal web-like member 21 which extends outwardly from pipe section 13 sufficiently to allow tightening of a plurality of threaded members 22 into a plurality of bolts 23 extending through bolt holes 24 formed in the gland 11. The bolt holes 24 are formed at the junction of the polygonal sides of the web-like member 21 and are evenly spaced about the circumference of the web-like member 21.

Each bolt hole 24 is surrounded by a raised circular boss 31 formed on one surface of the web-like member 21. Each bolt hole tapers from each end thereof to a reduced diameter near its axial center. A pair of reinforcing ribs 32 extend from each boss 31 along the periphery of the gland 11 toward the adjacent bosses 31, however instead of forming a continuous rib about the gland 11 the ribs 32 taper gradually to the surface of the web-like structure 21 and are not joined to each other intermediate the bosses 31, as is best illustrated in FIGS. 1 and 3. The tapered shape of the rib 32 may be linear as shown in the drawings are arcuate, however the ribs 32 preferentially will extend to the top of the boss 31. In as much as the ribs 32 extend along the circumference of the gland 11 on opposite sides of the bosses 31, they are bisected by a line drawn from the center of the associated boss 31 to the center of the gland 11.

A second pair of reinforcing ribs 33 extend radially from the bosses 31 and also taper downwardly to the surface of the web-like member 21. These reinforcing ribs are preferentially spaced about 90° apart on the boss 31 and are equidistant from a line drawn from the center of the boss 31 to the center of the gland 11. As shown in FIGS. 3 and 6, the ribs 32 and 33 both slope downwardly from the top of the bosses. It will also be appreciated that ribs 32 and 33 combine to provide rigidity as a pair laterally along the polygonal sides of the gland 11 and each pair of ribs 33 cooperate to provide rigidity radially from each boss 31 toward the pipe section. Further the ribs 32 and 33 provide additional seating area for the nut 22 or bolt 23 to reduce the tendency of the nut 22 to deform the boss and reduce the effectiveness of the seal. Since all four ribs at each boss 31 extend to the top of the boss 31 the nut 22 is equally supported and engaged on all sides.

While the foregoing features which have been described and are hereinafter claimed are at first impression unremarkable, they represent a significant advantage over the prior art. Testing of glands made in accordance with the claims defining the present invention have proven to resist bending forces generated by tightening the nut and bolt connectors even when more than twice the torque has been applied to the bolts as compared to the prior art. Such improved rigidity is believed to be the result of cooperative positioning of the plurality of ribs in their novel manner.

While I have shown my invention in various forms, it will be obvious to those skilled in the art that it is not so limited but is susceptible of various changes and modifications without departing from the spirit thereof.

What I claim is:

1. A pipe joint gland for forming an effective seal and preventing the separation of pipe sections comprising:
   (a) an annular web-like structure extending about said pipe section, having a substantially uniform thickness and being generally planar;
   (b) wall-like portion extending downwardly and inwardly of said web-like structure about said pipe section;
   (c) a plurality of evenly spaced bosses formed on the circumference of and extending above said web-like structure, each having a bolt hole therethrough;
   (d) a pair of downwardly sloping reinforcing ribs extending circumferentially on either side of each of said bosses along the periphery of said web-like structure; and
   (e) a second pair of downwardly sloping reinforcing ribs extending radially from each said boss with each rib of each pair being bisected by a radius of said pipe joint gland wherein each reinforcing rib tapers from the top of an associated boss to the surface of said web-like structure.

2. An improvement in a joint sealing gland for a pipe joint wherein a bell pipe end and spigot pipe end are joined together by affixing the gland about the spigot end and securing gland to the bell end by a plurality of bolts extending parallel to the pipe ends through bolt holes formed about the circumference of said gland, comprising:
   (a) a plurality of reinforcing bosses each surrounding one of said bolt holes and extending from one surface of said gland;
   (b) a pair of reinforcing ribs extending radially downwardly and outwardly from an associated one of said plurality of reinforcing bosses with each pair of reinforcing ribs being bisected by a line drawn from the center of said gland to the center of said associated boss; and
   (c) a second pair of reinforcing ribs extending downwardly and outwardly from each associated boss among the circumference of the gland wherein each reinforcing rib extends to the top of the associated boss.

3. An improvement in a joint sealing gland for a pipe joint wherein a bell pipe end and spigot pipe end are joined together by affixing the gland about the spigot end and securing the gland to the bell end by a plurality of bolts extending parallel to the pipe ends through bolt holes formed about the circumference of said gland, comprising:
   (a) a plurality of reinforcing bosses each surrounding one of said bolt holes and extending from one surface of said gland;
   (b) a pair of reinforcing ribs extending radially downwardly and outwardly from an associated one of said plurality of reinforcing bosses with each pair of reinforcing ribs being bisected by a line drawn from the center of said gland to the center of said associated boss; and
   (c) a second pair of reinforcing ribs extending downwardly and outwardly from each associated boss along the circumference of the gland wherein each reinforcing rib extends to the top of the associated boss and is disposed on said gland in non-intersecting relation to each other reinforcing rib.

4. A pipe joint gland for joining a bell pipe end and spigot pipe end comprising an inner circular portion disposed generally axially relative to one of said pipe ends and web-like generally polygonal portion extending radially from said circular portion having a plurality of bolt holes located at the intersection of the corners of said polygon, each bolt hole surrounded by a reinforcing boss on one side of said web-like portion, with a plurality of reinforcing ribs extending from each boss in a non-parallel, non-intersecting manner, with each rib tapering from said boss to the surface of said polygonal portion, said ribs being disposed in pairs with each pair being bisected by a line passing from the center of said gland to one corner of said polygonal portion.

5. A pipe joint gland as defined in claim 4 wherein one pair of said ribs associated with each boss extends radially therefrom and a second pair of said ribs associated with said boss extends therefrom along the periphery of said polygonal portion.

6. A pipe joint gland as defined in claim 5 wherein each of said reinforcing ribs extend to the top of said boss.

7. A pipe joint gland as defined in claim 6 wherein the ribs of said one pair of ribs extend from the boss at about 90° from each other.

8. A pipe joint gland for forming an effective seal and preventing the separation of pipe sections comprising:
   (a) an annular web-like structure extending about said pipe section, having a substantially uniform thickness and being generally planar;
   (b) a wall-like portion extending downwardly and inwardly of said web-like structure about said pipe section;
   (c) a plurality of evenly spaced bosses formed on the circumference of and extending about said web-like structure, each having a bolt hole therethrough;
   (d) a pair of downwardly sloping reinforcing ribs extending circumferentially on either side of each of said bosses along the periphery of said web-like structure; and
   (e) a second pair of downwardly sloping reinforcing ribs extending radially from each said boss with each rib of each pair being bisected by a radius of said pipe joint gland;
   wherein each reinforcing rib tapers from the top of an associated boss to the surface of said web-like structure and is disposed on said gland in non-intersecting relationship such that said web-like structure is generally planar intermediate said reinforcing ribs.

* * * * *